US010124381B2

United States Patent
Kubo

(10) Patent No.: US 10,124,381 B2
(45) Date of Patent: Nov. 13, 2018

(54) ROLLING PROCESS LEARNING CONTROL DEVICE

(71) Applicant: TOSHIBA MITSUBISHI-ELECTRIC INDUSTRIAL SYSTEMS CORPORATION, Chuo-ku (JP)

(72) Inventor: Naohiro Kubo, Tokyo (JP)

(73) Assignee: TOSHIBA MITSUBISHI-ELECTRIC INDUSTRIAL SYSTEMS CORPORATION, Chou-ku (JP)

( * ) Notice: Subject to any disclaimer, the term of this patent is extended or adjusted under 35 U.S.C. 154(b) by 37 days.

(21) Appl. No.: 15/119,313

(22) PCT Filed: Feb. 17, 2014

(86) PCT No.: PCT/JP2014/053622
§ 371 (c)(1),
(2) Date: Aug. 16, 2016

(87) PCT Pub. No.: WO2015/122010
PCT Pub. Date: Aug. 20, 2015

(65) Prior Publication Data
US 2017/0008054 A1    Jan. 12, 2017

(51) Int. Cl.
*G06F 19/00* (2018.01)
*B21B 37/00* (2006.01)
(Continued)

(52) U.S. Cl.
CPC .............. *B21B 37/00* (2013.01); *G05B 13/02* (2013.01); *G05B 13/0265* (2013.01); *G06N 3/08* (2013.01); *G06N 99/005* (2013.01)

(58) Field of Classification Search
CPC ....... B21B 37/00; B21B 37/16; B21B 37/165; B21B 37/24; B21B 37/74; B21B 37/78;
(Continued)

(56) References Cited

U.S. PATENT DOCUMENTS 6,782,304 B1 * 8/2004 Tsugeno .................. B21B 37/16
700/149

FOREIGN PATENT DOCUMENTS

JP    7-200005 A    8/1995
JP    10-31505 A    2/1998
(Continued)

OTHER PUBLICATIONS

International Search Report dated May 20, 2014 in PCT/JP2014/053622 Filed Feb. 17, 2014.

*Primary Examiner* — Hsien Ming Lee
(74) *Attorney, Agent, or Firm* — Oblon, McClelland, Maier & Neustadt, L.L.P.

(57) ABSTRACT

An instantaneous value of a learning coefficient is calculated based on a gap between a result value and a result recalculation value, and an update value of the learning coefficient is calculated from the instantaneous value. The calculated update value is recorded in a cell corresponding to present rolling conditions. A predetermined number of neighboring cells having small spatial distances from a target cell corresponding to next rolling conditions in a space having rolling conditions as coordinate axes are selected from cells in which respective evaluation results of recency, saturation, and stability of the learning coefficient satisfy criteria. An estimation value of the learning coefficient in the target cell is then calculated by polynomial interpolation. The most recent update value of the learning coefficient is then corrected with the estimation value, and used as a use value of the learning coefficient in the next rolling conditions.

4 Claims, 2 Drawing Sheets

11 RECALCULATE RESULT OF PREDICTION VALUE
12 CALCULATE LEARNING COEFFICIENT INSTANTANEOUS VALUE
13 CALCULATE LEARNING COEFFICIENT UPDATE VALUE
14 EVALUATE LEARNING COEFFICIENT RECENCY
15 EVALUATE LEARNING COEFFICIENT SATURATION
16 EVALUATE LEARNING COEFFICIENT STABILITY
21 HISTORY INFORMATION OF LEARNING COEFFICIENT INSTANTANEOUS VALUE
22 HISTORY INFORMATION OF LEARNING COEFFICIENT UPDATE VALUE
23 EVALUATION VALUE OF LEARNING COEFFICIENT RECENCY
24 EVALUATION VALUE OF LEARNING COEFFICIENT SATURATION
25 EVALUATION VALUE OF LEARNING COEFFICIENT STABILITY
31 SELECT NEIGHBORING CELL NUMBER
32 CALCULATE LEARNING COEFFICIENT ESTIMATION VALUE
33 READ LEARNING COEFFICIENT UPDATE VALUE
34 EVALUATE LEARNING COEFFICIENT OF PRESENT CELL
35 CALCULATE LEARNING COEFFICIENT USE VALUE
36 SETUP CALCULATION

(51) Int. Cl.
*G05B 13/02* (2006.01)
*G06N 3/08* (2006.01)
*G06N 99/00* (2010.01)

(58) Field of Classification Search
CPC .... G05B 13/00; G05B 13/0265; G05B 17/00; G05B 17/02; G05B 19/00; G05B 19/0405; G05B 19/401; G05B 19/4202; G06N 3/08; G06N 3/082; G06N 3/086; G06N 3/088; G06N 99/005
USPC ..... 700/95, 96, 108–111, 122, 127, 148–155
See application file for complete search history.

(56) References Cited

FOREIGN PATENT DOCUMENTS

| | | |
|---|---|---|
| JP | 2839746 B2 | 12/1998 |
| JP | 2000-263110 A | 9/2000 |
| JP | 2009-116759 A | 5/2009 |

\* cited by examiner

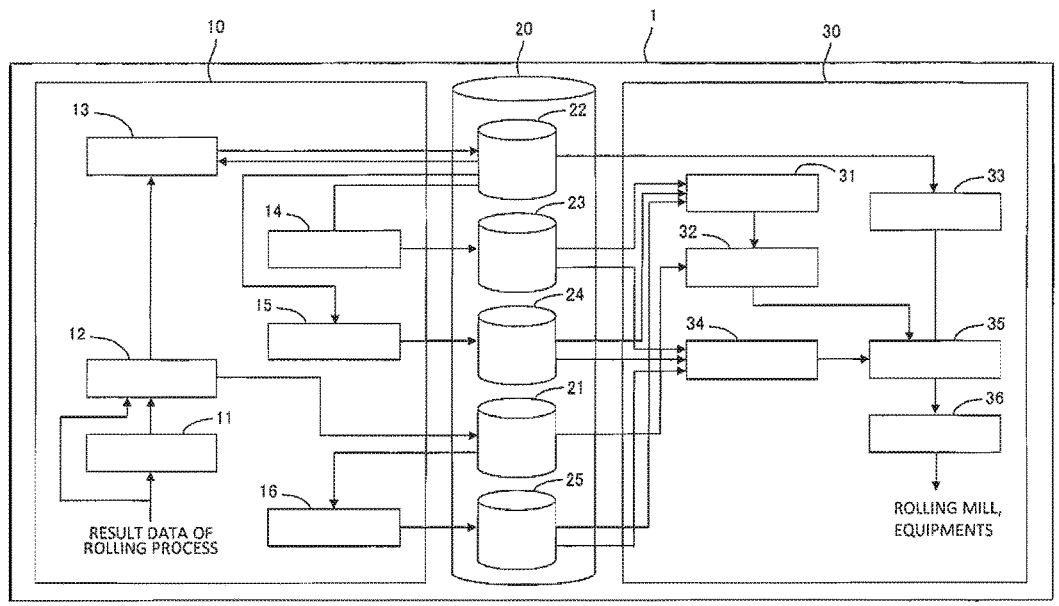

11 RECALCULATE RESULT OF PREDICTION VALUE
12 CALCULATE LEARNING COEFFICIENT INSTANTANEOUS VALUE
13 CALCULATE LEARNING COEFFICIENT UPDATE VALUE
14 EVALUATE LEARNING COEFFICIENT RECENCY
15 EVALUATE LEARNING COEFFICIENT SATURATION
16 EVALUATE LEARNING COEFFICIENT STABILITY
21 HISTORY INFORMATION OF LEARNING COEFFICIENT INSTANTANEOUS VALUE
22 HISTORY INFORMATION OF LEARNING COEFFICIENT UPDATE VALUE
23 EVALUATION VALUE OF LEARNING COEFFICIENT RECENCY
24 EVALUATION VALUE OF LEARNING COEFFICIENT SATURATION
25 EVALUATION VALUE OF LEARNING COEFFICIENT STABILITY
31 SELECT NEIGHBORING CELL NUMBER
32 CALCULATE LEARNING COEFFICIENT ESTIMATION VALUE
33 READ LEARNING COEFFICIENT UPDATE VALUE
34 EVALUATE LEARNING COEFFICIENT OF PRESENT CELL
35 CALCULATE LEARNING COEFFICIENT USE VALUE
36 SETUP CALCULATION

Fig.1

ROLLING PROCESS LEARNING CONTROL DEVICE

TECHNICAL FIELD

The present invention relates to a learning control device that calculates a learning coefficient of a model expression for predicting a rolling phenomenon based on result data, and manages it for each rolling condition, in control of a rolling process.

BACKGROUND ART

Control of a rolling process is to roll a material so that the rolled material after completion of manufacturing has desired dimensions and temperature. Rolling process control generally includes setup control and dynamic control. In the setup control, a rolling phenomenon is predicted by a model expression, and a setting value of equipment of a rolling facility, such as a rolling speed, an amount of cooling water, and a roll gap of a rolling mill, is decided so that the rolled material has the desired dimensions and temperature. However, the model expression cannot completely represent the physical phenomena that occur in the rolling process. In addition, a calculation expression that represents a model is simplified for reasons of reduction of a calculation load, convenience of adjustment, etc. For this reason, a deviation is generated between a result value measured by a sensor and a prediction value calculated by the model expression. Consequently, in conventional setup control of the rolling process, in order to achieve improvement and stability of prediction accuracy of the rolling phenomenon, learning control is performed in which a learning coefficient is provided in the model expression, and in which the learning coefficient is automatically adjusted based on result data. A finishing temperature and a rolling load are included in the result data, and they are collected regarding an aiming point of setup calculation.

Here, a summary of general learning control of a rolling process will be explained. The learning control includes a plurality of processes, and one of them is result recalculation. In the result recalculation, a model prediction value based on result data is calculated using a model expression. This is generally called a result recalculation value. The result recalculation value is compared with a result value included in the result data, and an error of the result recalculation value with respect to the result value, i.e. a model error, is calculated. For example, in a case of setup control of a roll gap of a rolling mill, a result value of a rolling load measured in a load cell is compared with the result recalculation value of the rolling load calculated from the result data using the model expression, and the model error of the rolling load is calculated.

A learning coefficient is then calculated based on the model error. The learning coefficient calculated at this time is called an instantaneous value of the learning coefficient. However, since it is unknown which factor causes the model error among factors ignored in simplifying and constructing the model expression, and disturbance and an error are included in the result data itself used for learning, the instantaneous value of the learning coefficient calculated from the model error cannot be applied to a next rolled material as it is. Consequently, it is performed to make the instantaneous value of the learning coefficient pass through a smoothing filter. A value obtained by smoothing the instantaneous value of the learning coefficient is used as an update value of the learning coefficient.

The following expression is a specific example of an expression of the smoothing filter that calculates the update value from the instantaneous value of the learning coefficient. A deviation between the instantaneous value of the learning coefficient and a previous value (the previous value of the update value) of the learning coefficient is multiplied by an update gain, and the previous value of the learning coefficient is added to a value obtained by the multiplication, whereby the update value of the learning coefficient is calculated.

$$Znew = Zuse*(1-\alpha) + Zcur*\alpha$$

Where, Znew: Learning coefficient update value
Zcur: Learning coefficient (Instantaneous value)
Zuse: Learning coefficient (Previous value)
$\alpha$: Learning coefficient update gain (Time constant of filter)

The calculated update value of the learning coefficient is generally recorded in a stratified table. Stratification is a concept for dividing rolling conditions, such as a thickness, a width, a strain, a strain rate, and a temperature of a rolled material. For example, when the thickness is divided into m, and the width into n, the stratified table includes m×n cells. Whenever rolling of the material is ended, the update value of the learning coefficient is calculated, and is recorded in a cell coincident with rolling conditions of the material. The learning coefficient different for each rolling condition can be appropriately managed by using the stratified table for recording the learning coefficient, and prediction accuracy of a rolling phenomenon is improved. That is, learning control using the stratified table is an important function to secure prediction accuracy of the rolling phenomenon of the model expression and to thereby secure quality accuracy of a product and stability of rolling.

However, there is also a problem in the learning control using the stratified table. The learning coefficient is managed by the stratified table, and thereby the learning coefficient is managed in one corresponding cell in the stratified table, and is smoothed and updated for each corresponding cell. For this reason, a number of rolling chances (number of rollings) are needed for the learning coefficient of one cell to be saturated. In addition, since a different cell number is selected if there is even a slight difference in a rolling condition, a learning coefficient of a different cell is newly updated. For this reason, a number of rolling chances are needed for each cell for all the cells included in the stratified table.

As one idea to reduce necessary rolling chances, a method can be considered in which when a learning coefficient of one cell is updated, a learning coefficient of an adjacent cell is also simultaneously updated. In this learning method, as shown in the following expression, the learning coefficient is calculated by the same method as mentioned above with respect to a cell (i, j) corresponding to present rolling conditions. Note that (i,j) indicates a coordinate of the corresponding cell in the stratified table.

$$Znew(i,j) = Zuse(i,j)*(1-\alpha) + Zcur(i,j)*\alpha$$

Where, Znew(i, j): Learning coefficient update value of corresponding cell
Zcur(i, j): Learning coefficient (Instantaneous value) of corresponding cell
Zuse(i, j): Learning coefficient (Previous value) of corresponding cell
$\alpha$: Learning coefficient update gain (Time constant of filter) of corresponding cell A learning coefficient is calculated by the following expression with respect to an adjacent cell (p, q). Note that (p, q) indicates a coordinate of the adjacent cell in the stratified table, which includes (i−1, j), (i, j−1), (i+1, j), and (i+1, j).

$$Znew(p,q)=Zuse(p,q)*(1-\alpha')+Zcur(i,j)*\alpha'$$

Where, Znew(p, q): Learning coefficient update value of adjacent cell

Zcur(i, j): Learning coefficient (Instantaneous value) of corresponding cell

Zuse(p, q): Learning coefficient (Previous value) of adjacent cell

α': Learning coefficient update gain (Time constant of filter) of adjacent cell

According to the learning method, the learning coefficient of the adjacent cell can be saturated with the fewest possible rolling chances. However, although learning of the adjacent cell proceeds, a learning coefficient of a cell a little away from the corresponding cell cannot be updated. That is, with the learning method, only a limited effect can be obtained regarding reduction of the rolling chances. In addition, when the learning coefficient of the corresponding cell is unstable, and fluctuation is large on each updating, the learning coefficient of the adjacent cell is also affected by the instability.

Further, there is also another problem in the learning control using the stratified table. The problem is that the learning control is hard to follow temporal change of the rolling process since the cell is subdivided. When there is no rolling for a while regarding rolling conditions corresponding to a certain cell, the rolling process may change in the meantime. Change of the rolling process described here includes both active change, such as change in temperature level in hot rolling and passive change, such as deterioration of facility. If the rolling process changes, change occurs also in a true learning coefficient. For this reason, when the update value of the learning coefficient recorded in the stratified table remains old, the value is probably not an appropriate one. When the learning coefficient that is not the appropriate value is applied to the model expression, an error included in a model prediction value becomes large to thereby reduce accuracy of the setting value of the equipment.

As described above, there are various problems in the learning control using the conventionally generally used stratified table. Meanwhile, there are also present proposals disclosed in the following PTLs 1 and 2 in the learning control using the stratified table.

The proposal disclosed in PTL 1 is a method for separating a gap by time-series fluctuation included in a gap between a model and a phenomenon as a time-series learning coefficient. The learning coefficients corresponding to the present rolling conditions are calculated by separating them into grouped learning coefficients depending on the rolling phenomenon and the time-series learning coefficients depending on temporal change, a model prediction value is corrected based on these two types of learning coefficients, and thereby accuracy of the model prediction value is improved. Specifically, an update value of the time-series learning coefficient is calculated using a smoothing filter based on an instantaneous value of the learning coefficient calculated from a model error, and a use value of the learning coefficient in connection with the rolling phenomenon in the present rolling conditions. The update value of the learning coefficient in connection with the rolling phenomenon in the present rolling conditions is then calculated using the smoothing filter based on a value that remains after removing the update value of the time-series learning coefficient from the instantaneous value of the learning coefficient.

According to the learning method proposed in PTL 1, the gap by time-series fluctuation of a process line can be extracted as the time-series learning coefficient. However, the grouped learning coefficient dependent on the rolling phenomenon is calculated for each cell even in the learning method. For this reason, even if the rolling process is changed while rolling by certain rolling conditions is not performed for a while, and thereby fluctuation occurs in a gap between a model and a phenomenon in the present rolling conditions, the fluctuation is not reflected in a learning coefficient recorded in a cell of the present rolling conditions. Consequently, a learning coefficient in which the gap between the model and the phenomenon has been appropriately corrected cannot be obtained in the first rolling in the present rolling conditions after the change of the rolling process.

A proposal disclosed in PTL 2 is a method in which a learning term of a model expression is recorded for each lot (cell) corresponding to a division of a rolled material, and a learning level of a learning term corresponding to a next lot is determined whenever the lot is changed, and in which if the learning level is lower than a criterion, the learning term of the next lot is corrected using a learning term of the other lot having a high learning level. Specifically, the learning level of the learning term of the next lot is determined on the basis of whether a learning frequency of the learning term of the next lot is not less than a reference frequency, and of whether a standard deviation of the most recent predetermined time of the learning term corresponding to the next lot is not more than a reference value. If the learning level is then lower than the criterion, correction of the learning term of the lot is performed using a smoothing filter based on a learning term of each lot adjacent to the lot on the table, and a correction coefficient decided according to the learning level.

According to the learning method proposed in PTL 2, even though the learning term of the next lot is unlearned, the unlearned learning term of the lot can be optimized using the learned learning term of the adjacent lot. However, the learning term of the adjacent lot is not necessarily more learned than the learning term of the next lot. When the learning term of the next lot is unlearned, and the learning term of the adjacent lot is also unlearned, setup calculation must be performed regarding the next lot based on the unlearned learning term. In addition, when the learning term of the adjacent lot is unstable, i.e. when a value largely fluctuates on each updating, the learning term of the next lot corrected using the learning term of the adjacent lot also becomes unstable. Further, when accuracy of the learning term of the adjacent lot has deteriorated with elapse of time due to change of the rolling process while rolling is not performed for a while, accuracy of the learning term of the next lot corrected using the learning term of the adjacent lot also deteriorates.

CITATION LIST

Patent Literature

[PTL 1] JP 2839746
[PTL 2] JP 2000-263110 A

SUMMARY OF INVENTION

Technical Problem

As mentioned above, not all the above-mentioned problems can be solved even by any learning method proposed in PTLs 1 and 2. That is, it cannot be said even now that a problem in a case where saturation of the learning coefficient is low (a problem of saturation), a problem in a case where the learning coefficient is unstable and fluctuation thereof is large (a problem of stability), and a problem in a case where the learning coefficient becomes old by the change of the rolling process while rolling is not performed for a while (a problem of recency) are sufficiently solved.

The present invention has been made in view of the above-described problems, and an object thereof is to obtain a learning coefficient that satisfies all of saturation, stability, and recency in each rolling condition in a learning control device that learns and manages a learning coefficient of a model expression used for setup calculation for each rolling condition.

Solution to Problem

A learning control device according to the present invention is the one that has a database including a plurality of cells that divide rolling conditions, and manages using the database a learning coefficient of a model expression used for setup calculation of a rolling process, and the learning control device is configured as follows in order to achieve the above-described object.

The learning control device according to the present invention includes instantaneous value calculation recording means and update value calculation recording means as means for calculating a learning coefficient to record it in the database. The instantaneous value calculation recording means is configured to calculate an instantaneous value of the learning coefficient based on a gap between a result value measured in the rolling process and a result recalculation value calculated using the model expression, and to record the calculated instantaneous value in a cell corresponding to the rolling conditions together with a learning date and time. By such a configuration of the instantaneous value calculation recording means, history information of the instantaneous value is recorded in the database for each cell. The update value calculation recording means is configured to calculate an update value of the learning coefficient based on the instantaneous value of the learning coefficient calculated by the instantaneous value calculation recording means and a previous value of the learning coefficient in the rolling conditions, and to record the calculated update value in the cell corresponding to the rolling conditions together with a learning date and time. By such a configuration of the update value calculation recording means, history information of the update value is recorded in the database for each cell.

Note that when the rolling conditions divided by the cells are two items, the history information of each of the instantaneous value and the update value may be managed in a stratified table. That is, the database may be configured to include first and second stratified tables having common cells, recording of the instantaneous value by the instantaneous value calculation recording means may be performed to the first stratified table, and recording of the update value by the update value calculation recording means may be performed to the second stratified table.

The learning control device according to the present invention includes: recency evaluation means for evaluating recency of a learning coefficient; saturation evaluation means for evaluating saturation of the learning coefficient; and stability evaluation means for evaluating stability of the learning coefficient. The recency evaluation means is configured to evaluate the recency of the learning coefficient of each of the plurality of cells based on the history information of the update value recorded in the database. The saturation evaluation means is configured to evaluate the saturation of the learning coefficient of each of the plurality of cells based on the history information of the update value recorded in the database. The stability evaluation means is configured to evaluate the stability of the learning coefficient of each of the plurality of cells based on the history information of the instantaneous value recorded in the database.

Note that like each history information of the instantaneous value and the update value, respective evaluation results of the recency, the saturation, and the stability can also be managed in the stratified table. In this case, the database may be configured to further include third to fifth stratified tables having cells in common with the first and the second stratified tables. Additionally, recording of the evaluation result of the recency by the recency evaluation means may be performed to the third stratified table, recording of the evaluation result of the saturation by the saturation evaluation means to the fourth stratified table, and recording of the evaluation result of the stability by the stability evaluation means to the fifth stratified table.

Further, the learning control device according to the present invention includes: neighboring cell selection means; estimation value calculation means; and use value decision means. The neighboring cell selection means is configured to select the predetermined number of neighboring cells having small spatial distances from a target cell corresponding to next rolling conditions in a space having rolling conditions as coordinate axes, from cells in which the respective evaluation results of the recency, the saturation, and the stability satisfy criteria. The estimation value calculation means is configured to decide representative values of learning coefficients in the selected predetermined number of neighboring cells, respectively, and to calculate an estimation value of the learning coefficient in the target cell by polynomial interpolation based on a coordinate of the target cell, and coordinates and the representative values of the selected predetermined number of neighboring cells. Additionally, the use value decision means is configured to correct the most recent update value of the learning coefficient in the target cell with the estimation value, and to decide the corrected value as a use value of a learning coefficient in the next rolling conditions.

Preferably, the use value decision means is configured to calculate the use value by a weighted average between the most recent update value and the estimation value. A weighting coefficient of the weighted average is more preferably changed according to the evaluation results so that the higher the evaluation results of the recency, the saturation, and the stability with respect to the target cell are, the larger a weight of the most recent update value becomes, and so that the lower the evaluation results are, the larger a weight of the estimation value becomes.

Advantageous Effects of Invention

According to the learning control device according to the present invention configured as described above, a learning coefficient that is the most recent one, and has high saturation and stability can be applied to a cell to which rolling conditions of a next material correspond. Hereby, accuracy of a model prediction value in setup control can be improved, and eventually, accuracy of product quality, and stability of operation can be improved.

BRIEF DESCRIPTION OF DRAWINGS

FIG. 1 is a diagram showing a configuration and a processing flow of a rolling process learning control device according to an embodiment of the present invention.

DESCRIPTION OF EMBODIMENTS

Figure 2:
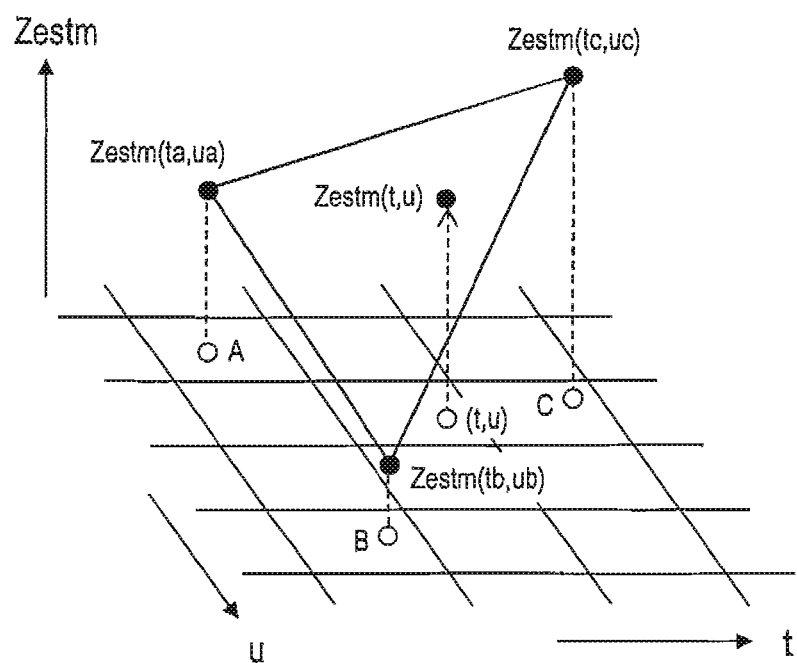
FIG. 2 is a diagram illustrating a calculation method of an estimation value of a learning coefficient.

Hereinafter, an embodiment of the present invention will be explained with reference to drawings.

There is shown in FIG. 1 a configuration and a processing flow of a rolling process learning control device according to the embodiment. This learning control device 1 includes: a learning device 10; a storage device 20; and a setup calculation device 30. The learning device 10 is the device that learns a learning coefficient of a model expression used for setup calculation based on result data of a rolling process. The storage device 20 is the device that stores in a database the learning coefficient of the model expression and information in relation thereto. The database includes a plurality of cells that divide rolling conditions. In more detail, the database includes five stratified tables 21, 22, 23, 24, and 25. Each of the plurality of cells is shared among the five stratified tables 21, 22, 23, 24 and 25. This means that the five stratified tables 21, 22, 23, 24 and 25 are provided for each cell. The coordinate of the cell represents the rolling condition. In the embodiment, the rolling conditions are two items of a thickness and a width of a rolled material, and a table having the thickness and the width as coordinate axes is used for each stratified table. When a number of the thickness is "i", and a number of the width is "j", (i, j) is a coordinate of the cell in each stratified table. The setup calculation device 30 is the device that calculates a model prediction value using the learning coefficient stored in the database, and decides a setup value of equipment of a rolling apparatus based on the model prediction value.

First, details of the learning device 10 will be explained. A processing unit 11 performs result recalculation of the model prediction value based on the result data of the rolling process. A processing unit 12 calculates an instantaneous value of the learning coefficient based on a model error between a result recalculation value calculated by the processing unit 11 and a result value included in the result data. A processing unit 13 calculates an update value of the learning coefficient by making the instantaneous value of the learning coefficient calculated by the processing unit 12 pass through a smoothing filter. Calculation methods of the instantaneous value and the update value of the learning coefficient are the same as contents in conventional learning control explained in "Background".

After rolling of one rolled material is completed, the learning control device records the instantaneous value and the update value of the learning coefficient in a cell to which rolling conditions of the material correspond, respectively. In detail, the instantaneous value of the learning coefficient is recorded in the first stratified table 21. The processing unit 12 selects the cell corresponding to the present rolling conditions from the plurality of cells included in the first stratified table 21. The processing unit 12 then stores history information of the instantaneous value in the first stratified table 21 by recording the calculated instantaneous value in the selected cell in time series. In more detail, the instantaneous values of the learning coefficient regarding past N rolled materials are stored in the first stratified table 21 for each individual cell as history information together with learning dates and times. A number is attached to the stored information in order from the most recent one. Namely, newly stored information is set to be the first one, and a number of (i+1) is newly attached to the i-th information whenever information is added. In addition, if information of N rolled materials is already stored when information is added, the oldest N-th information is discarded, and a number of N is newly attached to the (N−1)th information.

The update value of the learning coefficient is recorded in the second stratified table 22. The processing unit 13 selects a cell corresponding to the present rolling conditions from the plurality of cells included in the second stratified table 22. The processing unit 13 then stores history information of the update value in the second stratified table 22 by recording the calculated update value in the selected cell in time series. In more detail, the update values of the learning coefficient regarding past M rolled materials are stored in the second stratified table 22 for each individual cell as history information together with learning dates and times. A number is attached to the stored information in order from the most recent one similarly to the history information relating to the instantaneous value of the learning coefficient. Namely, the number of (i+1) is newly attached to the i-th information with the newly stored information being set to be the first one, and if information of M rolled materials is already stored, the oldest M-th information is discarded, and a number of M is newly attached to the (M−1)th information.

The learning control device updates the history information of each of the update value and the instantaneous value of the learning coefficient, and subsequently, performs three evaluations regarding the learning coefficient. A first evaluation is the evaluation of recency of the learning coefficient, and it is performed to all the cells. A second evaluation is the evaluation of saturation of the learning coefficient, and it is performed to a cell corresponding to the rolling conditions of the present material, i.e. the cell in which updating of history information has been performed in this process. A third evaluation is the evaluation of stability of the learning coefficient, and it is also performed to the corresponding cell.

A processing unit 14 performs the evaluation of recency of the learning coefficient. The processing unit 14 evaluates whether or not the update value of the learning coefficient of each cell of the second stratified table 22 is the recent one based on the history information of the update values of the learning coefficient stored in the second stratified table 22. If updating of each cell is performed after a certain time, the update value of the learning coefficient can be determined to be the recent one. The following expression is used for the determination.

$$\varepsilon(k,l) < \varepsilon\text{time}$$

Where, (k, l): Coordinate of cell (however, k, l is a combination of all the rolling conditions)

$\varepsilon(k, l)$: Time difference between update time of learning coefficient of present material and update time of cell (k, l)

$\varepsilon\text{time}$: Determination reference value of recency

If the above-described expression is satisfied, the processing unit 14 determines that the update value of the learning coefficient stored in the cell (k, l) is the most recent one, and sets FCZtime(k, l) to be 1. If the above-described expression is not satisfied, the processing unit 14 determines that the update value of the learning coefficient stored in the cell (k, l) is not the most recent one, and sets FCZtime(k, l) to be 0. Note that FCZtime(k, l) is a numerical value that indicates an evaluation result of recency of the update value of the learning coefficient. If FCZtime(k, l) is 1, it means that the update value is the most recent one, and if 0, it means not the most recent one. The processing unit 14 performs determination by the above-described expression to all the cells.

The recency evaluation value FCZtime(k, l) decided for each cell by the processing unit 14 is recorded in a corresponding cell in the third stratified table 23.

A processing unit 15 performs the evaluation of saturation of the learning coefficient. The processing unit 15 evaluates whether or not the update value of the learning coefficient of the cell is saturated based on the history information of the update value of the learning coefficient stored in the second stratified table 22. Regarding the first to the m-th (m≤M) values of the update values of the learning coefficient, a change amount of the update values of the learning coefficient of each of from the m-th to the (m−1)th, from the i-th to the (i−1)th, and from the second to the first is calculated, and if the change amount has converged toward 0, the update value of the learning coefficient of the corresponding cell is determined to be saturated. The following expression is used for the determination.

$$CZmdf(r,s) < \varepsilon mdf$$

Where, (r, s): Coordinate of corresponding cell
CZmdf(r, s): Average value of change amounts of update values of learning coefficient of corresponding cell
εmdf: Determination reference value of saturation
The average value CZmdf(r, s) of the change amounts of the update values is calculated by the following expression.

$$CZmdf(r,s) = \frac{\sum_{i=m}^{2}\left\{\frac{|Zmdf(r,s)(i) - Zmdf(r,s)(i-1)|}{|Zmdf(r,s)(1)|}\right\}}{m} \quad [\text{Math. 1}]$$

Where, Zmdf(r, s)(i): i-th storage value of update value of learning coefficient If the above-described expression is satisfied, the processing unit 15 determines that the update value of the learning coefficient stored in the corresponding cell (r, s) is saturated, and sets FCZmdf(r, s) to be 1. If the above-described expression is not satisfied, the processing unit 15 determines that the update value of the learning coefficient stored in the corresponding cell (r, s) is not saturated, and sets FCZmdf(r, s) to be 0. In addition, if M<m is established, the processing unit 15 sets FCZmdf(r, s) to be 0. Note that FCZmdf(r, s) is a numerical value that indicates an evaluation result of saturation of the update value of the learning coefficient. If FCZmdf(r, s) is 1, it means that the update value is saturated, and if 0, it means not saturated.

The saturation evaluation value FCZmdf(r, s) decided by the processing unit 15 is recorded in the corresponding cell (r, s) of the fourth stratified table 24.

A processing unit 16 performs the evaluation of stability of the learning coefficient. The processing unit 16 evaluates whether or not the instantaneous value of the learning coefficient of the cell is stable based on the history information of the instantaneous value of the learning coefficient stored in the first stratified table 21. If a fluctuation amount of the first to the n-th (n≤N) values of the instantaneous values of the learning coefficient is small, the instantaneous value of the learning coefficient of the corresponding cell is determined to be stable. The following expression is used for the determination.

$$CZcur(r,s) < \varepsilon cur$$

Where, (r, s): Coordinate of corresponding cell
CZcur(r, s): Standard deviation of change amounts of instantaneous values of learning coefficient of corresponding cell
εcur: Determination reference value of stability
The standard deviation CZcur(r, s) of the change amounts of the instantaneous values is calculated by the following expression.

$$CZcur(r,s) = \frac{\sum_{i=1}^{n}\left\{Zcur(r,s)(i) - \sum_{j=1}^{n}\frac{Zcur(r,s)(j)}{n}\right\}^{2}}{n} \quad [\text{Math. 2}]$$

Where, Zcur(r, s)(i): i-th storage value of instantaneous values of learning coefficient If the above-described expression is satisfied, the processing unit 16 determines that the instantaneous value of the learning coefficient stored in the corresponding cell (r, s) is stable, and sets FCZcur(r, s) to be 1. If the above-described expression is not satisfied, the processing unit 16 determines that the instantaneous value of the learning coefficient stored in the corresponding cell (r, s) is not stable, and sets FCZcur(r, s) to be 0. In addition, if N<n is established, the processing unit 16 sets FCZcur(r, s) to be 0. Note that FCZcur(r, s) is a numerical value that indicates an evaluation result of stability of the instantaneous value of the learning coefficient. If FCZcur(r, s) is 1, it means that the instantaneous value is stable, and if 0, it means not stable.

The stability evaluation value FCZcur(r, s) decided by the processing unit 16 is recorded in the cell (r, s) of the fifth stratified table 25.

According to the processes as described above, the instantaneous value and the update value of the learning coefficient regarding the cell corresponding to the rolling condition of the present material are stored. Further, recency of the learning coefficient of all the cells is evaluated, saturation and stability of the learning coefficient of the corresponding cell are also evaluated, and the evaluation values are also stored in the corresponding cells.

Next, details of the setup calculation device 30 will be explained. The setup calculation device 30 determines by two methods learning coefficients of a cell to which rolling conditions of a next material correspond, i.e. a target cell that is a target of model prediction using the model expression, and calculates from the learning coefficients a use value of the learning coefficient applied at the time of rolling of the next material. One method is the method for indexing and reading the most recent update value of the cell to which the rolling conditions of the next material correspond from the history information of the update values of the learning coefficient stored in the second stratified table 22. Processing according to the method is performed by a processing unit 33. Here, a coordinate of the cell of the next material is set to be (t, u), and the update value of the learning coefficient read by the processing unit 33 is set to be Zmod(t, u).

Another method is the method for calculating an estimation value of the learning coefficient in the cell of the next material using learning coefficients of cells near the cell of the next material. Processing according to the method is performed by processing units 31 and 32. Specifically, first, the processing unit 31 selects cells that satisfy predetermined conditions from the cells near the cell of the next material. The conditions are the following three ones:
1) Learning is updated by comparatively recent data;
2) Update value of learning coefficient is saturated; and
3) Instantaneous value of learning coefficient is stable.

The processing unit 31 selects cells in which the evaluation results are determined to be 1 in all of the third, fourth, and fifth stratified tables 23, 24, and 25. The processing unit 31 then extracts three cells having small spatial distances from the cell (t, u) to which the next material corresponds in order from the cell having the smaller one. Here, the selected three cells are set to be a cell A (ta, ua), a cell B (tb, ub), and a cell C (tc, uc).

The processing unit 32 calculates a representative value representing the most recent K instantaneous values (for example, an average value or a median value of the most recent K instantaneous values, or an average value or a median value of (K−2) instantaneous values excluding a maximum value and a minimum value from the most recent K instantaneous values, etc.) of each of the cell A (ta, ua), the cell B (tb, ub), and the cell C (tc, uc) selected by the processing unit 31 based on the history information of the instantaneous value stored in the first stratified table 21. Here, the representative value of the cell A (ta, ua) is set to be Zestm(ta, ua), the representative value of the cell B (tb, ub) is Zestm(tb, ub), and the representative value of the cell C (tc, uc) is Zestm (tc, uc).

The processing unit 32 specifies a linear polynomial established between each coordinate and each representative value of the selected cell A (ta, ua), cell B (tb, ub), and cell C (tc, uc) using the above three representative values of the learning coefficient. That is, as shown in FIG. 2, a flat surface that passes through three coordinate points (ta, ua, Zestm(ta, ua)), (tb, ub, Zestm(tb, ub)), and (tc, uc, Zestm(tc, uc)) is determined in a three-dimensional space having as coordinate axes the width, the thickness that are the rolling conditions, and the learning coefficient, respectively. The flat surface can be determined assuming satisfying the following expression.

$$Zestm(t,u)=a*t+b*u+c$$

Where, coefficients a, b, and c of the above-described expression of the flat surface are calculated assuming satisfying the following conditions.

$$Zestm(ta,ua)=a*ta+b*ua+c$$

$$Zestm(tb,ub)=a*tb+b*ub+c$$

$$Zestm(tc,uc)=a*tc+b*uc+c$$

It is confirmed by experience that each criterion of recency, saturation, and stability of the learning coefficient is satisfied on the flat surface specified by the above-described expression. The processing unit 32 calculates an estimation value of the learning coefficient that satisfies recency, saturation, and stability by calculating the learning coefficient of the cell (t, u) to which the next material corresponds by polynomial interpolation using the above-described expression. Here, assume that an estimation value of the learning coefficient calculated by a processing unit 34 is set to be Zestm(t, u).

According to a procedure as described above, the update value Zmod(t, u) of the learning coefficient and the estimation value Zestm(t, u) of the learning coefficient of the cell (t, u) to which the next material corresponds are obtained. A processing unit 35 calculates a use value of the learning coefficient in the rolling conditions of the next material based on these two learning coefficients. In more detail, the processing unit 35 decides the use value of the learning coefficient by correcting the update value Zmod(t, u) of the learning coefficient with the estimation value Zcstm(t, u) of the learning coefficient by the following weighted average expression.

$$Zuse(t,u)=\beta*Zmod(t,u)+(1-\beta)*Zestm(t,u)$$

Where, Zuse(t, u): Use value of learning coefficient
β: Weighting coefficient (0≤β≤1)

If recency, saturation, and stability of the update value Zmod(t, u) of the learning coefficient are good, the processing unit 35 gives weight to the update value Zmod(t, u) of the learning coefficient by increasing a value of the weighting coefficient β. Conversely, if the recency, the saturation, and the stability of the estimation value Zestm(t, u) of the learning coefficient are good, the processing unit 35 can give weight to the estimation value Zestm(t, u) of the learning coefficient by decreasing the value of the weighting coefficient β. Examples of methods for deciding the weighting coefficient β are shown below.

β=1.0 (in a case where the update value Zmod(t, u) satisfies all of recency, saturation, and stability)

β=0.6 (in a case where the update value Zmod(t, u) satisfies two of the recency, the saturation, and the stability)

β=0.4 (in a case where the update value Zmod(t, u) satisfies one of the recency, the saturation, and the stability)

β=0.0 (in a case where the update value Zmod(t, u) satisfies none of the recency, the saturation, and the stability)

A processing unit 36 corrects the model expression by the use value of the learning coefficient calculated by the processing unit 35. Hereby, accuracy improvement of prediction calculation by the model expression is achieved. The processing unit 36 then performs setup calculation using the corrected model expression, and decides the setup value of the equipment of the rolling apparatus. Each equipment is operated in accordance with the setup value decided as described above, and thereby accuracy of product quality, and stability of operation can be improved.

Hereinbefore, the embodiment of the present invention has been explained. However, the present invention is not limited to the above-mentioned embodiment, and can be variously modified to be carried out without departing from the scope of the present invention. For example, the rolling conditions divided by the cells may be more than two items. Although the rolling conditions are set to be two items of the width and the thickness in the above-mentioned embodiment, the rolling conditions can be set to be not less than three items, and the learning coefficients can also be managed by multi-dimensional database not less than three dimensions. If the rolling conditions are three items, four cells having small spatial distances from a target cell are selected in order from the cell having the smaller one from the cells in which recency, saturation, and stability satisfy criteria, in a three-dimensional space having the rolling conditions as coordinate axes, and thereby an estimation value of a learning coefficient in the target cell can be calculated by polynomial interpolation.

Note that in the above-mentioned embodiment, the processing unit 12 corresponds to instantaneous value calculation recording means, the processing unit 13 to update value calculation recording means, the processing unit 14 to recency evaluation means, the processing unit 15 to saturation evaluation means, and that the processing unit 16 to stability evaluation means. In addition, the processing unit 31 corresponds to neighboring cell selection means, the processing unit 32 to estimation value calculation means, and the processing units 34 and 35 to use value decision means. Routines corresponding to respective processing units are stored as one program in a memory of a computer included in the learning control device 1. The program is executed by a processor of the computer, and thereby the computer functions as each processing unit.

REFERENCE SIGNS LIST

1 Learning control device
10 Learning device
20 Storage device (Database)
21, 22, 23, 24, and 25 Stratified table
30 Setup calculation device

The invention claimed is:

1. A rolling process learning control device that has a database including a plurality of cells that divide rolling conditions, and manages using the database a learning coefficient of a model expression used for setup calculation of a rolling process, the rolling process learning control device comprising:
    a processor to execute a program; and
    a memory to store the program which, when executed by the processor, causes the rolling process learning control device to serve as:
        an instantaneous value calculation recording unit that calculates an instantaneous value of the learning coefficient based on a gap between a result value measured in the rolling process and a result recalculation value calculated using the model expression, and records the instantaneous value in a cell corresponding to present rolling conditions together with a learning time;
        an update value calculation recording unit that calculates an update value of the learning coefficient based on the instantaneous value and a previous value of the learning coefficient in the present rolling conditions, and records the update value in the cell corresponding to the present rolling conditions together with a learning time;
        a recency evaluation unit that evaluates recency of the learning coefficient of each of the plurality of cells based on history information of the update value stored in the database;
        a saturation evaluation unit that evaluates saturation of the learning coefficient of each of the plurality of cells based on the history information of the update value stored in the database;
        a stability evaluation unit that evaluates stability of the learning coefficient of each of the plurality of cells based on history information of the instantaneous value stored in the database;
        a neighboring cell selection unit that selects a predetermined number of neighboring cells in order of a spatial distance from a target cell corresponding to next rolling conditions in a space having rolling conditions as coordinate axes, from the cells in which respective evaluation results of the recency, the saturation, and the stability satisfy criteria;
        an estimation value calculation unit that decides representative values of the learning coefficients in the selected predetermined number of neighboring cells, respectively, and calculates an estimation value of the learning coefficient in the target cell by polynomial interpolation based on a coordinate of the target cell, and coordinates and the representative values of the selected predetermined number of neighboring cells; and
        an use value decision unit that corrects the most recent update value of the learning coefficient in the target cell with the estimation value, and decides a corrected value as a use value of the learning coefficient in the next rolling conditions.

2. The rolling process learning control device according to claim 1, wherein
    the use value decision unit is configured to:
        calculate the use value by a weighted average between the most recent update value and the estimation value; and
        change a weighting coefficient of the weighted average according to the evaluation results so that the higher the evaluation results of the recency, the saturation, and the stability with respect to the target cell are, the larger a weight of the most recent update value becomes, and so that the lower the evaluation results are, the larger a weight of the estimation value becomes.

3. The rolling process learning control device according to claim 1, wherein
    the database includes first and second stratified tables having common cells,
    the instantaneous value calculation recording unit is configured to record the instantaneous value in the first stratified table, and
    the update value calculation recording unit is configured to record the update value in the second stratified table.

4. The rolling process learning control device according to claim 3, wherein
    the database further includes third, fourth, and fifth stratified tables having cells in common with the first and the second stratified tables,
    the recency evaluation unit is configured to record the evaluation result of the recency in the third stratified table,
    the saturation evaluation unit is configured to record the evaluation result of the saturation in the fourth stratified table, and
    the stability evaluation unit is configured to record the evaluation result of the stability in the fifth stratified table.

* * * * *